US00RE48524E

(19) United States
(12) Reissued Patent
Shen et al.

(10) Patent Number: US RE48,524 E
(45) Date of Reissued Patent: Apr. 20, 2021

(54) CUTTING ELEMENTS HAVING CUTTING EDGES WITH CONTINUOUS VARYING RADII AND BITS INCORPORATING THE SAME

(71) Applicant: Smith International, Inc., Houston, TX (US)

(72) Inventors: Yuelin Shen, Spring, TX (US); Youhe Zhang, Spring, TX (US); Michael J. Janssen, The Woodlands, TX (US)

(73) Assignee: Smith International, Inc., Houston, TX (US)

(21) Appl. No.: 15/720,844

(22) Filed: Sep. 29, 2017

Related U.S. Patent Documents

Reissue of:
(64) Patent No.: 9,145,743
Issued: Sep. 29, 2015
Appl. No.: 13/958,445
Filed: Aug. 2, 2013

U.S. Applications:
(63) Continuation of application No. 11/638,934, filed on Dec. 13, 2006, now Pat. No. 8,499,860.

(60) Provisional application No. 60/750,457, filed on Dec. 14, 2005.

(51) Int. Cl.
*E21B 10/567* (2006.01)
*E21B 10/573* (2006.01)

(52) U.S. Cl.
CPC ..... *E21B 10/5673* (2013.01); *E21B 10/567* (2013.01); *E21B 10/5676* (2013.01); *E21B 10/573* (2013.01)

(58) Field of Classification Search
CPC ..... E21B 10/567; E21B 10/5676; E21B 10/5673; E21B 10/573; E21B 10/5735
See application file for complete search history.

(56) References Cited

U.S. PATENT DOCUMENTS 4,570,726 A * 2/1986 Hall ..... E21B 10/5735 175/426
5,484,191 A * 1/1996 Sollami ..... E21B 10/567 299/105
5,551,760 A * 9/1996 Sollami ..... E21B 10/567 299/105
5,839,526 A * 11/1998 Cisneros et al. ..... 175/431
(Continued)

FOREIGN PATENT DOCUMENTS

GB 2 324 533 A 10/1998
GB 2324553 * 10/1998
(Continued)

OTHER PUBLICATIONS

International Search Report on Application No. GB0624819.9 for search done on Mar. 19, 2007.

*Primary Examiner* — William C Doerrler
(74) *Attorney, Agent, or Firm* — Osha Bergman Watanabe & Burton LLP

(57) ABSTRACT

A cutting element is provided having a substrate and an ultra hard material cutting layer over the substrate. The cutting layer includes a surface portion for making contact with a material to be cut by the cutting element. The surface portion in cross-section has a curvature that has a varying radius of curvature. A bit incorporating such a cutting element is also provided.

49 Claims, 16 Drawing Sheets

(56) References Cited

U.S. PATENT DOCUMENTS

| | | | | | |
|---|---|---|---|---|---|
| 5,881,830 | A * | 3/1999 | Cooley | E21B 10/5673 | 175/428 |
| 6,290,008 | B1 * | 9/2001 | Portwood | E21B 10/52 | 175/420.1 |
| 6,550,556 | B2 * | 4/2003 | Middlemiss | B23C 5/202 | 175/430 |
| 6,929,079 | B2 * | 8/2005 | McDonough | E21B 10/16 | 175/420.1 |
| 7,152,703 | B2 | 12/2006 | Meiners et al. | E21B 10/52 | 175/426 |
| 7,475,744 | B2 | 1/2009 | Pope | E21B 10/567 | 175/374 |
| 8,499,860 | B2 * | 8/2013 | Shen et al. | 175/426 | |
| 2002/0153174 | A1 | 10/2002 | Linden et al. | E21B 10/56 | 175/426 |
| 2006/0283639 | A1 * | 12/2006 | Yong | E21B 10/52 | 175/432 |
| 2008/0035387 | A1 | 2/2008 | Hall et al. | E21B 10/43 | 175/426 |

FOREIGN PATENT DOCUMENTS

| | | | | |
|---|---|---|---|---|
| GB | 2 357 532 | A | 6/2001 | |
| GB | 2357532 | * | 6/2001 | |
| GB | 2 398 586 | A | 8/2004 | |
| GB | 2398586 | * | 8/2004 | |
| WO | WO 99/09293 | | 2/1999 | |
| WO | WO-9909293 | A1 * | 2/1999 | E21B 10/5673 |

* cited by examiner

18
X
X
R1
R2
R3
42
98
20
100
99
44

FIG. 14A (New)
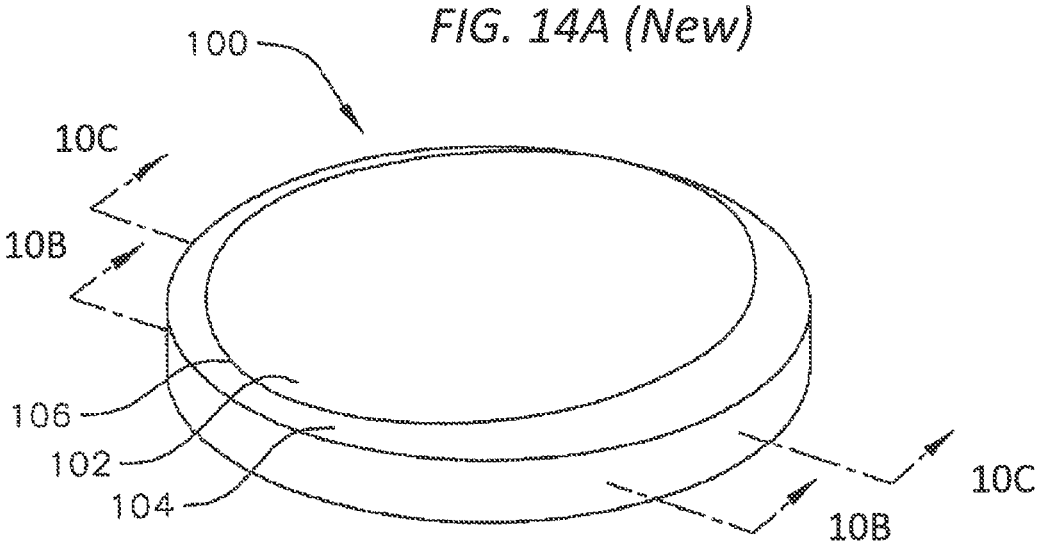
FIG. 14B (New)
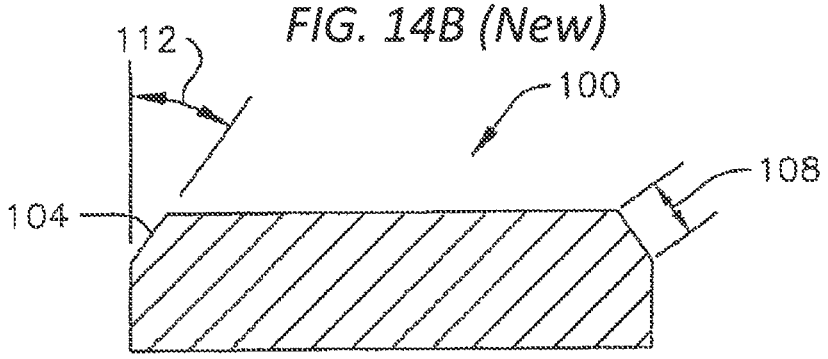
FIG. 14C (New)
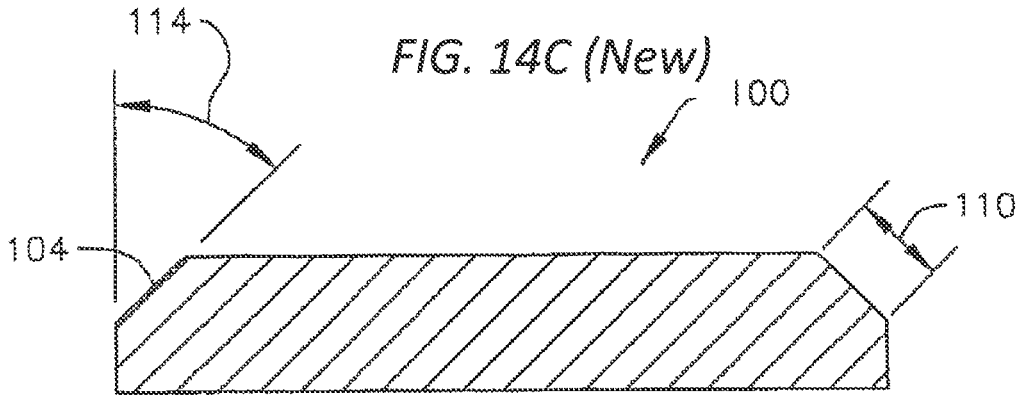

FIG. 15 (New)
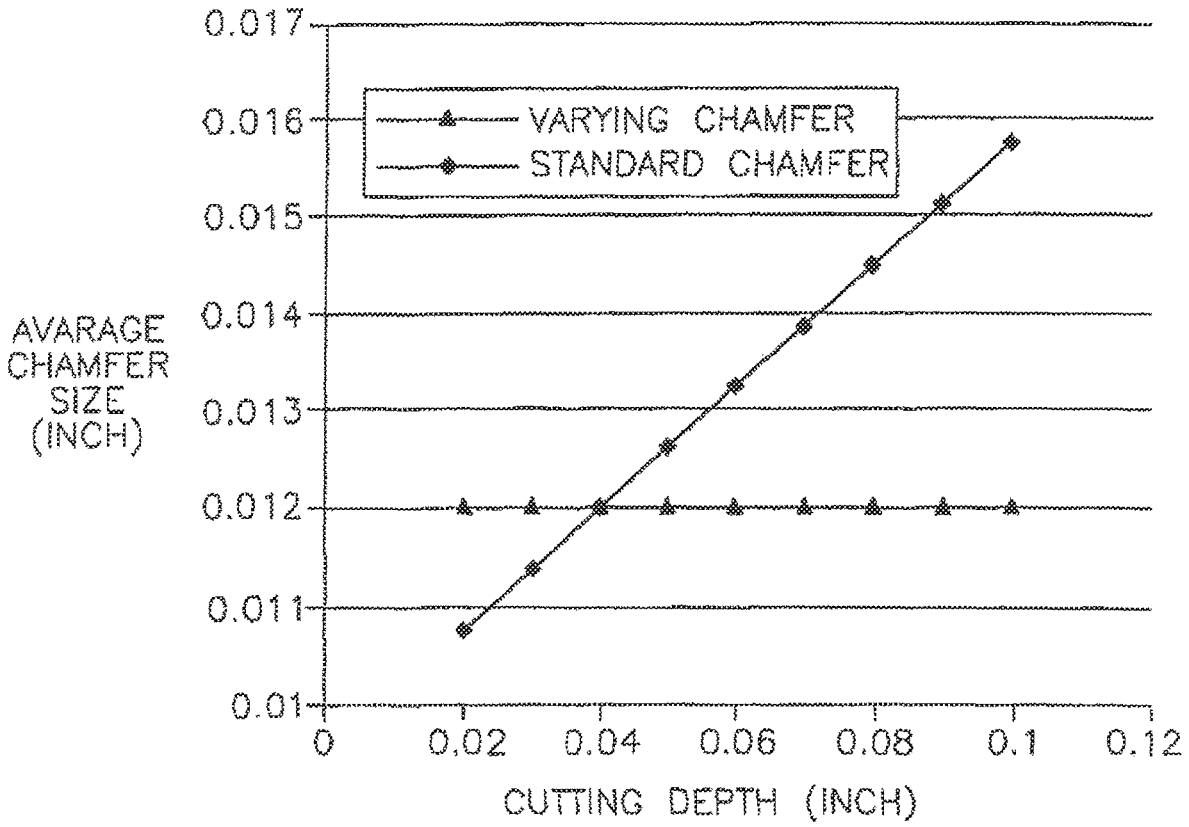

FIG. 16 (New)
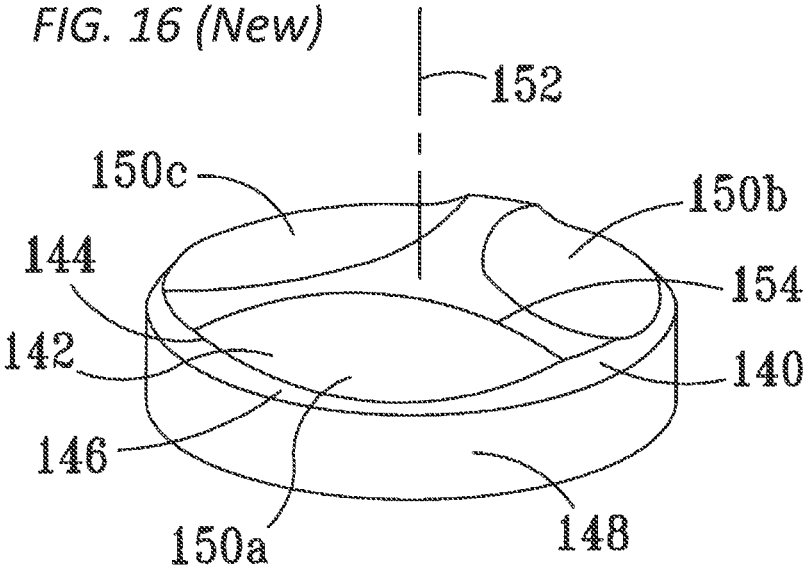
FIG. 17 (New)
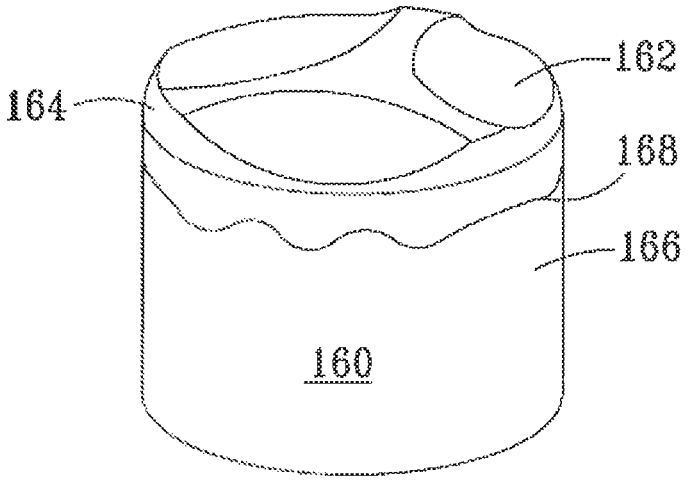

CUTTING ELEMENTS HAVING CUTTING EDGES WITH CONTINUOUS VARYING RADII AND BITS INCORPORATING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. application Ser. No. 11/638,934, filed Dec. 13, 2006, which is based upon and claims priority to U.S. Provisional Application No. 60/750,457 filed on Dec. 14, 2005, the contents of which are fully incorporated herein by reference.

BACKGROUND OF THE INVENTION

This invention relates to cutting elements such as those used in earth boring bits for drilling earth formations. More specifically, this invention relates to cutting elements incorporating a cutting surface having a cutting edge having a continuous varying radius.

A cutting element 1 (FIG. 1), such as shear cutter mounted on an earth boring bit typically has a cylindrical cemented carbide body 10, i.e. a substrate, having an end face 12 (also referred to herein as an "interface surface"). An ultra hard material layer 18, such as polycrystalline diamond (PCD), polycrystalline cubic boron nitride (PCBN) or a thermally stable polycrystalline (TSP) material is bonded on the interface surface forming a cutting layer. The cutting layer can have a flat, curved or non-uniform interface surface 12. Cutting elements are mounted in pockets 2 of an earth boring bit, such a drag bit 7, at an angle 8, as shown in FIGS. 1 and 2 and contact the earth formation 11 during drilling along edge 9 over cutting layer 18.

Generally speaking, the process for making a cutting element employs a substrate of cemented tungsten carbide where the tungsten carbide particles are cemented together with cobalt. The carbide body is placed adjacent to a layer of ultra hard material particles such as diamond or cubic boron nitride (CBN) particles along with a binder, such as cobalt, within a refractory metal enclosure (commonly referred to as a "can"), as for example a niobium can, and the combination is subjected to a high temperature at a high pressure where diamond or CBN is thermodynamically stable. This is known as a sintering process. The sintering process results in the re-crystallization and formation of a PCD or PCBN ultra hard material layer on the cemented tungsten carbide substrate, i.e., it results in the formation of a cutting element having a cemented tungsten carbide substrate and an ultra hard material cutting layer. The ultra hard material layer may include tungsten carbide particles and/or small amounts of cobalt. Cobalt promotes the formation of PCD or PCBN. Cobalt may also infiltrate the diamond or CBN from the cemented tungsten carbide substrate.

A TSP is typically formed by "leaching" the cobalt from the diamond lattice structure of PCD. When formed, PCD comprises individual diamond crystals that are interconnected defining a lattice structure. Cobalt particles are often found within the interstitial spaces in the diamond lattice structure. Cobalt has a significantly different coefficient of thermal expansion as compared to diamond, and as such upon heating of the PCD, the cobalt expands, causing cracking to form in the lattice structure, resulting in the deterioration of the PCD layer. By removing, i.e., by leaching, the cobalt from the diamond lattice structure, the PCD layer becomes more heat resistant, i.e., more thermally stable. However, the polycrystalline diamond layer becomes more brittle. Accordingly, in certain cases, only a select portion, measured either in depth or width, of the PCD layer is leached in order to gain thermal stability without losing impact resistance. A TSP material may also be formed by forming PCD with a thermally compatible silicon carbide binder instead of cobalt.

The cemented tungsten carbide substrate is typically formed by placing tungsten carbide powder and a binder in a mold and then heating the binder to melting temperature causing the binder to melt and infiltrate the tungsten carbide particles fusing them together and cementing the substrate. Alternatively, the tungsten carbide powder may be cemented by the binder during the high temperature, high pressure sintering process used to re-crystallize the ultra hard material layer. In such case, the substrate material powder along with the binder are placed in the refractory metal enclosure. Ultra hard material particles are provided over the substrate material to form the ultra hard material polycrystalline layer. The entire assembly is then subjected to a high temperature, high pressure process forming the cutting element having a substrate and a polycrystalline ultra hard material layer over it.

In many instances the cutting edge of the cutting layer, which contacts the earth formation during drilling, such as edge 9, has sharp edges. These sharp edges may be defined by the intersection of the upper and circumferential surfaces defining the cutting layer or by chamfers formed on the cutting edge. These sharp edges create stress concentrations which may cause cracking and chipping of the cutting layer.

SUMMARY OF THE INVENTION

In an exemplary embodiment, a cutting element is provided having a substrate and an ultra hard material cutting layer over the substrate. The cutting layer includes a surface portion for making contact with a material to be cut by the cutting element. The surface portion in cross-section has a curvature that has a varying radius of curvature. In other words, the surface portion in cross-section has a continuous curvature that is formed by a plurality of sections, each section having a different radius of curvature than its adjacent section. In another exemplary embodiment, a cutting element is provided having a substrate and an ultra hard material cutting layer over the substrate. The cutting layer includes a surface portion for making contact with a material to be cut by the cutting element. The surface portion in cross-section has a varying curvature that is formed by a plurality of adjacent non-flat sections, each section having a different radius of curvature than its adjacent section. In a further exemplary embodiment, the surface portion in cross-section includes at least two sections. In another exemplary embodiment, all sections curve in the same direction in cross-section. In yet another exemplary embodiment, one section curves in a first direction and another section curves in a second direction opposite the first direction. In yet a further exemplary embodiment, the surface portion in cross-section defines a chamfer. The chamfer may be formed from a plurality of the surface sections. In another exemplary embodiment, the surface portion in cross-section defines a two chamfers. Each of the two chamfers may be formed from a plurality of the surface sections. In one exemplary embodiment, the surface portion extends from a peripheral surface of the cutting layer. In another exemplary embodiment, the surface portion in cross-section includes at least three sections.

In a further exemplary embodiment, the surface portion includes in cross-section a first section adjacent to a second section which is adjacent a third section. With this exemplary embodiment, the first section has a first radius of curvature, the second section has a second radius of curvature, the third section has a third radius of curvature, such that the second radius of curvature is greater than the first radius of curvature, and the third radius of curvature is greater than the first radius of curvature. In another exemplary embodiment, the surface portion includes in cross-section a first section, a first transitional section extending from and adjacent to the first section, a second section extending from and adjacent to the first transitional section, a second transitional section extending from and adjacent to the second section, and a third section extending from and adjacent to the second transitional section. With this exemplary embodiment, the first section has a first radius of curvature, the second section has a second radius of curvature, the third section has a third radius of curvature, such that the second radius of curvature is greater than the first radius of curvature, and the third radius of curvature is greater than the first radius of curvature. In yet another exemplary embodiment, the cutting layer includes a first surface interfacing with the substrate and a second surface opposite the first surface. With this exemplary embodiment, the first section extends from the second surface. In yet a further exemplary embodiment, the cutting layer includes a first surface interfacing with the substrate, a second surface opposite the first surface, and a peripheral surface between the first and second surfaces. With this exemplary embodiment, the third section extends from the peripheral surface.

In yet another exemplary embodiment, the surface portion in cross-section includes at least 35 sections. In yet a further exemplary embodiment, the cutting layer includes a plurality of spaced apart surface portions, each surface portion in cross-section having a continuous curvature that is formed by a plurality of non-flat sections, and each section of each surface portion has a different radius of curvature than its adjacent section.

In another exemplary embodiment, a cutting element is provided having a substrate and an ultra hard material cutting layer over the substrate. The cutting layer has a surface portion for making contact with a material to be cut by the cutting element. The surface portion in cross-section has a first chamfer formed by a plurality of first sections where each first section has a different radius of curvature than its adjacent first section. In another exemplary embodiment, the surface portion for making contact further includes in cross-section a second chamfer extending relative to the first chamfer. In an exemplary embodiment, the second chamfer in cross-section is formed by a plurality of second sections, each second section having a different radius of curvature that its adjacent second section. In yet another exemplary embodiment, the surface portion for making contact further includes in cross-section a curved section adjacent to and between the two chamfers. In a further exemplary embodiment, the surface portion for making contact further includes in cross-section a third chamfer extending relative to the second chamfer. The third chamfer is formed by a plurality of third sections and each third section has a different radius of curvature that its adjacent third section. In yet a further exemplary embodiment, all of the first sections are not flat. In another exemplary embodiment, the cutting layer includes a plurality of spaced apart surface portions, each surface portion in cross-section having a first chamfer formed by a plurality of first sections, each first section having a different radius of curvature than its adjacent first section.

In yet a further exemplary embodiment a bit is provided having a body and any of the aforementioned exemplary embodiment cutting element mounted on such body.

BRIEF DESCRIPTION OF THE DRAWINGS

*FIGS. 14A, 14B, and 14C are perspective and cross-sectional views of an ultra hard top layer having a varied geometry chamfer circumferentially around the cutting edge of the working surface of the ultra hard layer wherein the size of the chamfer is varied circumferentially around the cutting edge according to one embodiment;*

*FIG. 15 is a graph showing the average chamfer size as varied with different cutting depths for a cutter having varied chamfer as compared to a cutter having fixed geometry chamfer,*

*FIG. 16 shows an ultra hard layer according to one or more embodiments.*

*FIG. 17 shows a cutter according to one or more embodiments.*

DETAILED DESCRIPTION OF THE INVENTION

Applicants have discovered that they can do away with the problems of existing cutting surfaces in a cutting element cutting layer by forming the cutting surface portion of the cutting layer to have a continuously varying radius as viewed in cross-section. The term "cutting surface" as used herein in relation to a cutting layer, refers to the surface portion of the cutting layer that makes contact with the material to be cut, as for example the earth formation, during cutting or drilling. "Cross-section" as used herein refers to the cross-section defined by a plane along the central longitudinal axis of the cutting element. Moreover. the inventive cutting surface geometries as described herein are formed as part of the manufacturing process of the cutting elements.

Figure 1:
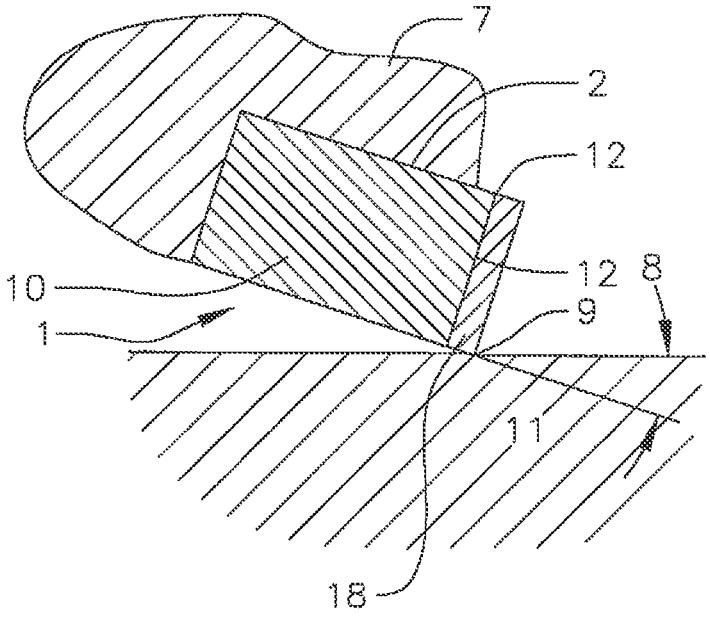
FIG. 1 is a partial cross-sectional view of a cutting element mounted on a bit as viewed along arrows 1-1 shown in FIG. 2.
Figure 2:
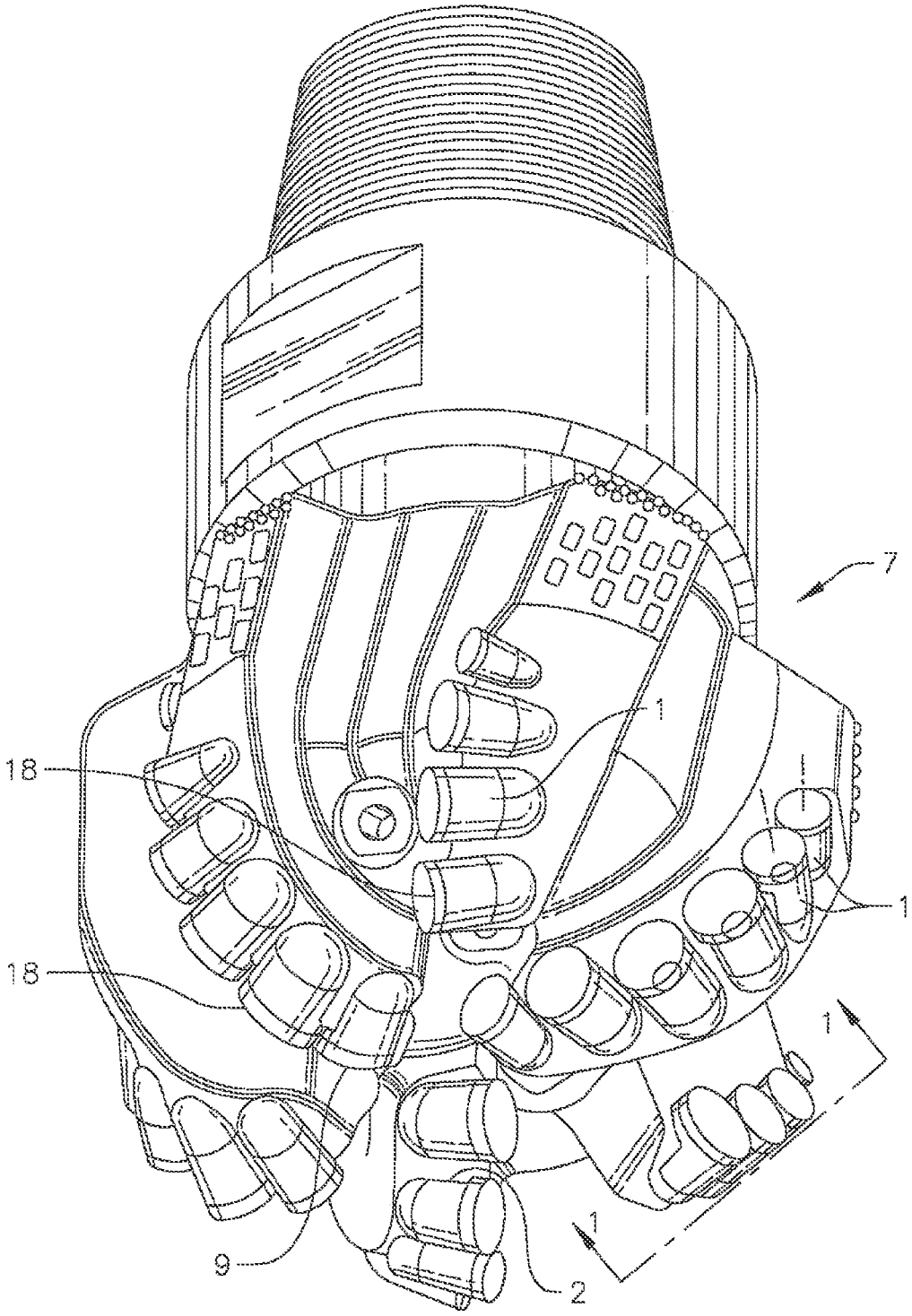
FIG. 2 is a perspective view of a bit incorporating cutting elements such as a cutting element shown in FIG. 1 or cutting elements of the present invention.
Figure 3:
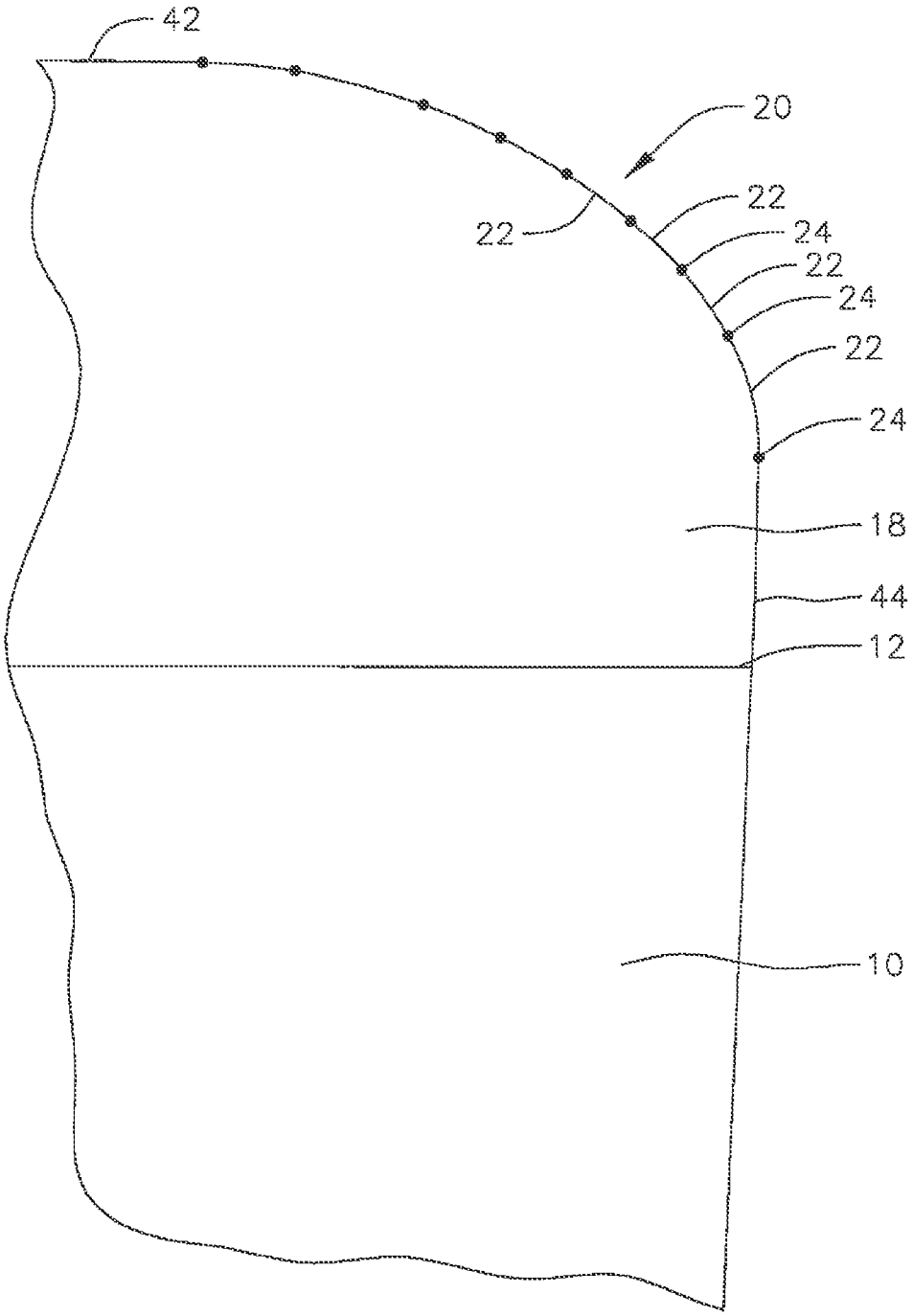
FIGS. 3, 4, 5 and 14 are partial cross-sectional views of exemplary embodiment cutting elements having cutting edges having continuous varying radii.

In one exemplary embodiment, as for example shown in FIG. 3, the cutting surface 20 is formed to have a curvature in cross-section having a continuous varying curvature. In other words, the cutting surface is defined by a plurality of abutting different curvature sections 22. For illustrative purposes, each curvature section is shown bounded by two dots 24. The different curvature sections intersect each other without forming sharp edges. In the exemplary embodiment shown in FIG. 3, the cutting surface is formed from eight distinct surface curvature sections 22. In an exemplary embodiment each section has a different radius of curvature from its abutting sections.

Figure 4:
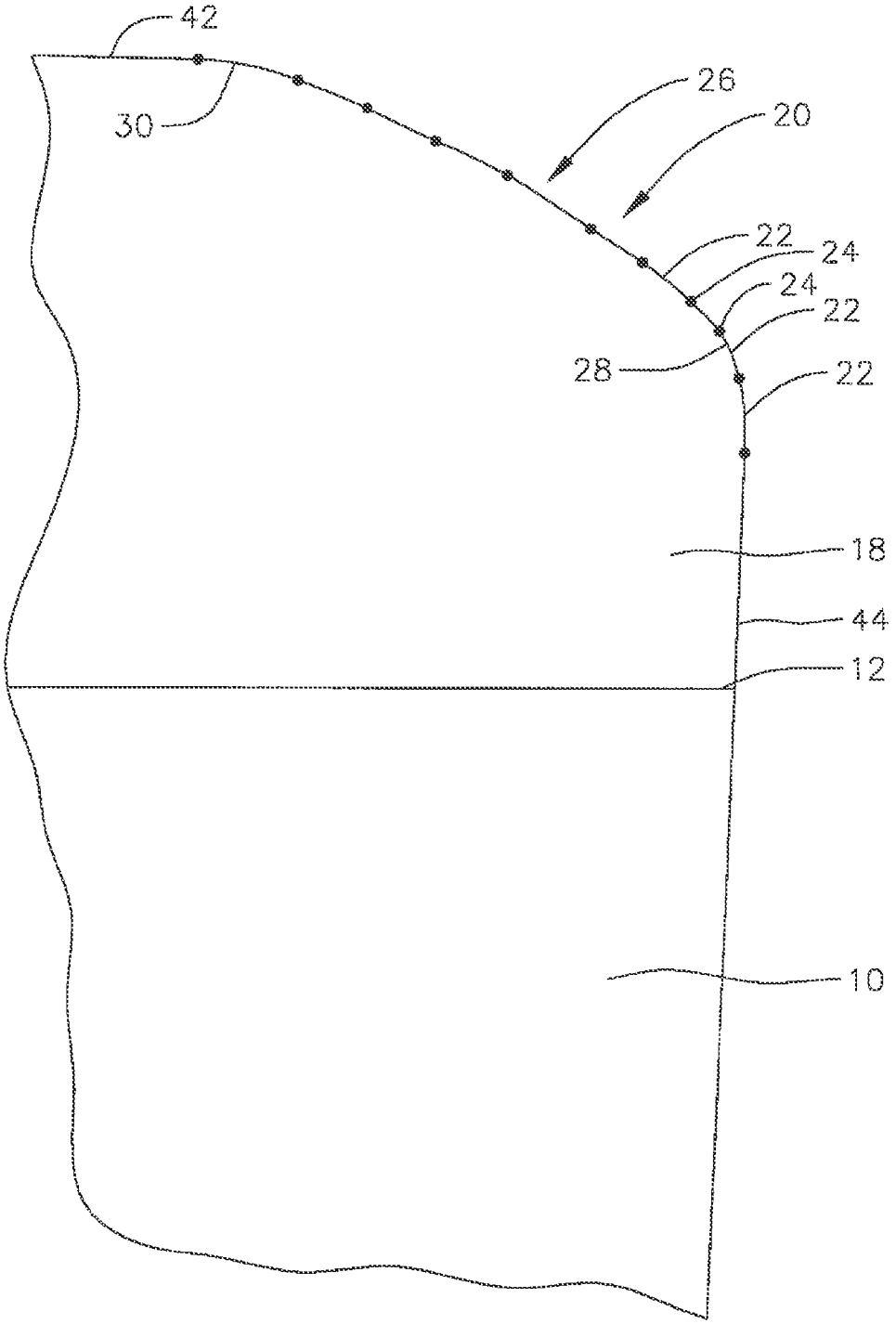

In another exemplary embodiment, as shown in FIG. 4, the cutting surface 20 has a single chamfer 26 having a varying radius in cross-section without having any sharp edges. As shown in the exemplary embodiment shown in FIG. 4, the cutting surface is defined in cross-section by a plurality of different surface curvature sections 22. In an exemplary embodiment, each section has a different radius of curvature from its abutting sections. The chamfer 26 in the shown exemplary embodiment is itself also formed from a plurality of abutting sections each having a radius of curvature. In the shown exemplary embodiment, the sections forming the chamfer 26 each have a relative large radius of curvature but are not flat. In the shown exemplary embodiment, the chamfer 26 extends from about location 28 to about location 30 on the cutting surface.

Figure 5:
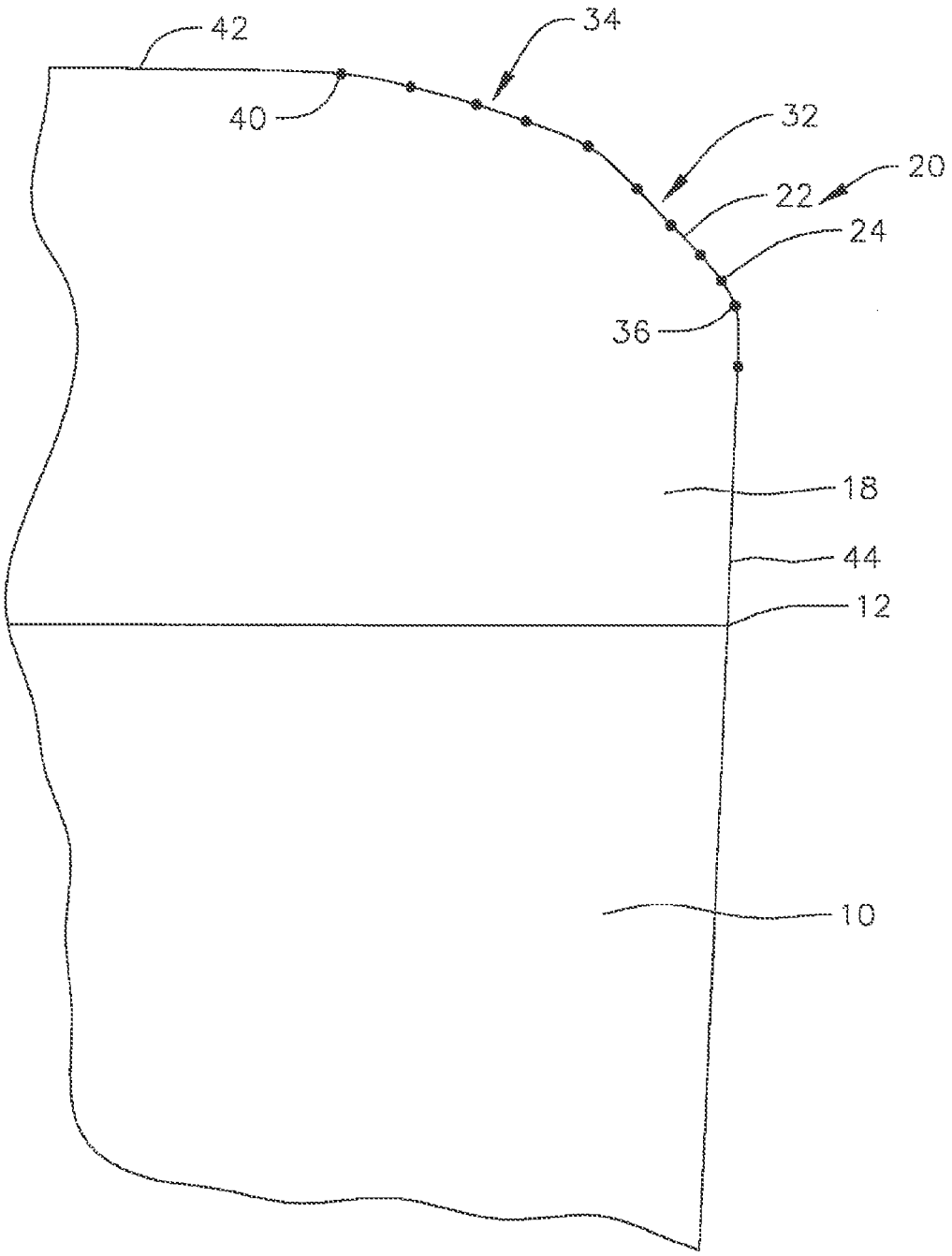

In another exemplary embodiment as shown in FIG. 5, the cutting surface is formed in cross-section from a plurality of abutting surface sections defining a double chamfer, i.e., a first chamfer 32 and a second chamfer 34, without any sharp edges. In the shown exemplary embodiment, the first chamfer 32 extends from about location 36 to about location 38 on the cutting surface, while the second chamfer 34 extends from about location 38 to about location 40 on the cutting surface. In this exemplary embodiment, each cutting surface section 22 has a radius of curvature that is different from the radii of curvature of its abutting sections. In an exemplary embodiment, each of the first and second chamfers 32 and 34 is formed from a plurality of sections none of which are completely flat.

In other exemplary embodiments, each chamfer, as for example chamfer 26, chamfer 32 or chamfer 34 may be formed in cross-section from one or more curved sections abutting each other. In further exemplary embodiments, the cutting surface may have three or more chamfers where each chamfer is formed in cross-section from one or more abutting curving sections.

By forming the cutting surface to have a single chamfer, a double chamfer or other multiple chamfers and by forming the cutting surface from multiple sections each having a different radius of curvature as viewed in cross-section, the cutting layer has all the advantages of a cutting layer incorporating a chamfered edge as for example described in Provisional Application No. 60/566,751 on Apr. 30, 2004 and being assigned to Smith International, Inc., as well as in the ordinary application having Ser. No. 11/117,648 and filed on Apr. 28, 2005, which claims priority on Provisional Application No. 60/566,751. The advantages of chamfered edges are also disclosed in U.S. Pat. No. 5,437,343 issued on Aug. 1, 1995. The contents of these provisional applications, ordinary applications and patent are fully incorporated herein by reference. *Thus, embodiments may also include cutters having shaped working surfaces with a varied geometry chamfer. Referring now to FIG. 14A, FIG. 14A shows an ultra hard top layer for a cutter that has a shaped working surface 112 including a varied geometry chamfer 114 circumferentially around the cutting edge 116. The bevel 114 is varied in size circumferentially around the cutting edge 116 according to one embodiment. The change in the size or the width of the bevel is demonstrated in the elevation section views of FIGS. 14B and 14C taken along section lines B-B and C-C of FIG. 14A, respectively. In this embodiment, the width 118 in FIG. 10B is smaller than the width 120 in FIG. 14C. The angle 122 of the bevel at section B-B, FIG, 14B, is the same as angle 124 at section line C-C, FIG. 14C; however, in other embodiments, the angle of the bevel is varied circumferentially around the cutting edge. It will be understood that a varied geometry of a bevel could also be provided as a combination of varied size and varied angle. Additionally, in one or more embodiments, the bevel is formed so that its size increases away from the area of the cutter surface engaged with the geological formation. For example, referring to FIG. 15, the amount of the variable size bevel in contact with the formation increases with the depth of cut. Thus, when the cutter digs into the formation, a greater portion of the cutting edge has a larger bevel to give more protection against chipping and spalling.*

*FIG. 16 shows another embodiment of an ultra hard top layer 140 for a cutter with a shaped working surface 142 and having a varied geometry chamfer 144 circumferentially around a cutting edge 146 at the intersection of the shaped working surface 142 and a side surface 148. The shaped working surface 142 includes one or more depressions 150a 150b, and 150c extending radially outwardly to the cutting edge 146. While three depressions 150a-c are depicted uniformly spaced around the shaped working surface 142, fewer or a greater number with uniform or non-uniform spacing may be formed without departing from certain aspects of the disclosure. For example, one or more depressions 150a-c can be formed as one or more planar surfaces or facets in a face 154.*

*Depending upon the embodiment, the face 154 may be a planar shaped surface, a dome shaped surface or a surface having another shape. The depressions 150a-c in this embodiment comprise planar surfaces or facets each at an obtuse angle relative to a central axis 152 of the cylindrical ultra hard top layer. The obtuse angle is different from the angle of other portions of the working surface, such that a relative depressed area defining the depressions 150a-c is formed the face 154. Where the surrounding portions of the face 154 are planar and at a 90-degree angle with respect to the axis of the cutter, the obtuse angle is generally greater than 90 degrees with respect to the axis 152 of the cutter. However, according to alternative embodiments of the invention, the obtuse angle may be less than 90 degrees. It will also be understood that in other alternative embodiments, each of the depressions 150a-c can be multi-faceted or comprised of multiple planar surfaces. Alternatively, the depressions 150a-c can also be formed with simple curved*

*surfaces that may be concave or convex or can be formed with a plurality of curved surfaces or with a smooth complex curve.*

*The depressions 150a-c may be formed and shaped during the initial compaction of the ultra hard layer 140 or can be shaped after the ultra hard layer is formed, for example by Electro Discharge Machining (EDM) or by Electro Discharge Grinding (EDG). The ultra hard layer 140 may, for example, be formed as a polycrystalline diamond compact or a polycrystalline cubic boron nitride compact. Also, in selected embodiments, the ultra-hard layer may comprise a "thermally stable" layer. One type of thermally stable layer that may be used in embodiments may be a TSP element or partially or fully leached polycrystalline diamond. The depressions 150a-c extend generally at an angle relative to the face 154 outward to the edge of the cutter. It has been found that a varied chamfer 144 can be conveniently made with a fixed angle and fixed depth EDM or EDG device. For example, an EDM device will typically cut deepest into the edge 146 where the raise areas of face 154 extend to the edge 146 and will cut less deep where the depressions 150a-c extend to the edge 146. The chamfer 144 is cut the least at the lowest edge point in each depression 150a-c and progressively deeper on either side of the lowest edge point. A varied width or size chamfer is conveniently formed circumferentially around the edge 146 of the ultra hard cutter layer 140. Alternatively, variable or programmable angle and depth EDM or EGM can be used to form the variable geometry chamfer. FIG. 17 shows a three-dimensional model of a cutter 160 having an ultra hard layer 162 with a shaped working surface 164. The ultra hard layer 162 is bonded to a substrate 166 at a non-planar interface 168 according to one embodiment of the invention.*

Figure 6:
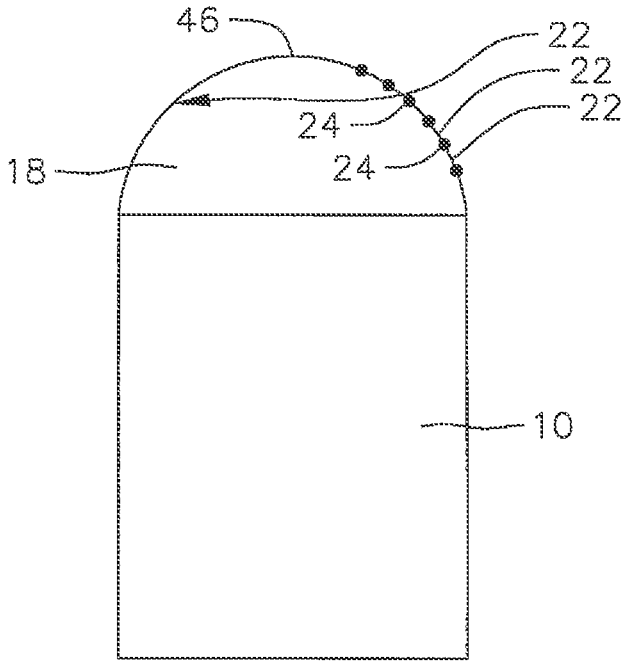
FIG. 6 is a cross-sectional view of another exemplary embodiment cutting element having a cutting edge having a continuous varying radii.

The exemplary continuously curving cutting surface may be formed on a cutting layer beginning at the substrate interface surface 12 and extending to an upper surface 42 of the cutting layer 18. In the embodiment shown in FIGS. 3, 4 and 5, the cutting layer 18 has a peripheral surface 44 and an upper surface 42 and the inventive cutting surface is defined between these two surfaces. In another exemplary embodiment, the entire outer surface of the cutting layer is formed to have a continuous changing curvature in cross-section, i.e., the entire outer surface is formed from sections each having different radii of curvature. In a farther exemplary embodiment, the inventive cutting surface may be part of a domed shaped cutting layer 18 having a domed shaped outer surface 46, as for example shown in FIG. 6. It should be noted that the terms "upper" and "lower" are used herein for descriptive purposes to describe relative positions and not exact positions. For example, a lower surface may be higher than an upper surface and vice versa.

Figure 14:
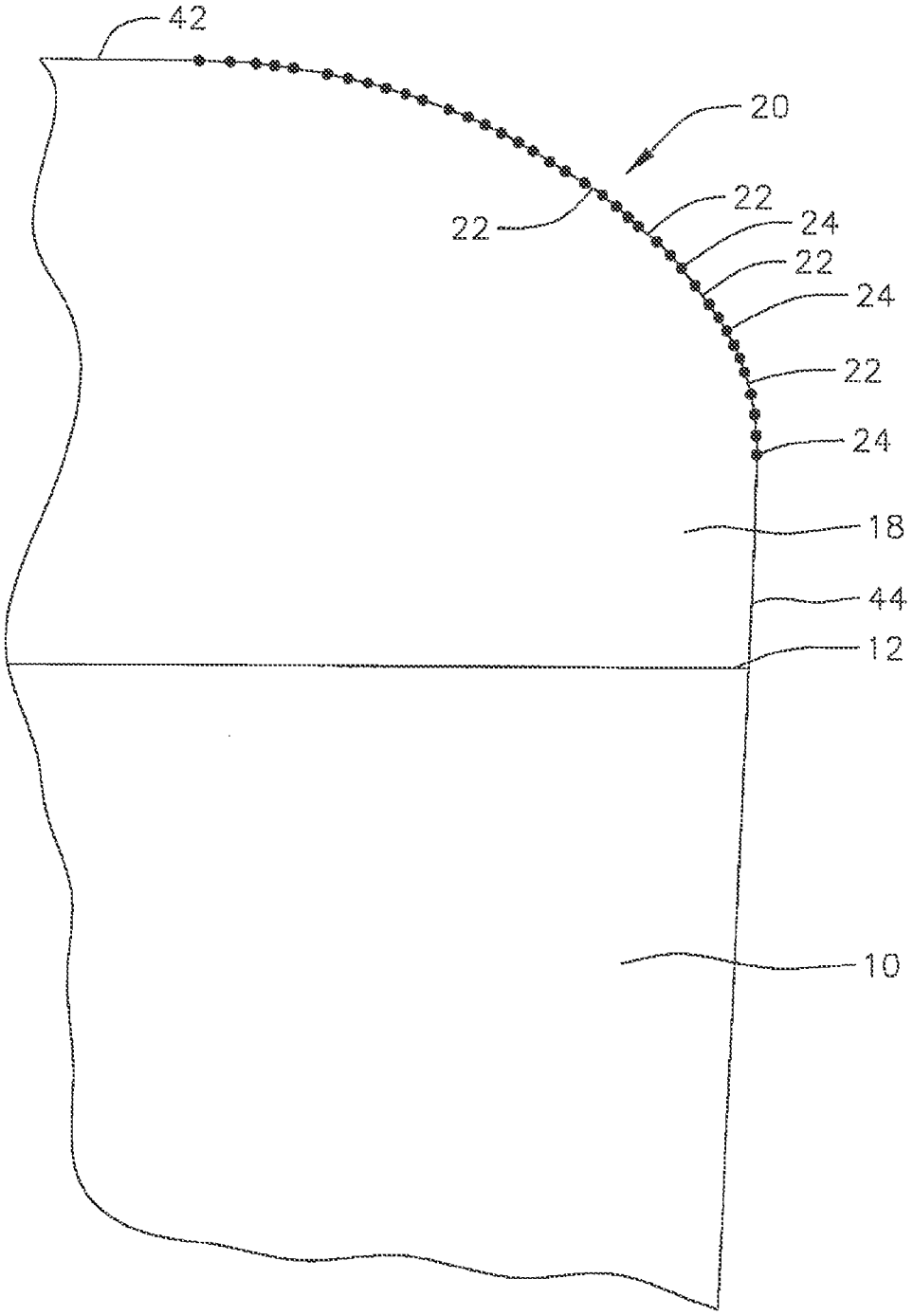

In an exemplary embodiment, the cutting surface may be defined in cross-section by at least two curvature sections. In another exemplary embodiment, the cutting surface may be defined by thirty-five curvature sections 22 (FIG. 14). In both of these embodiments, abutting sections have different radii of curvature. Applicants believe that at least two, but more likely at least three, abutting curvature sections in cross-section may be required to define a cutting surface of the present invention. It should be understood that the varying radius cutting surface may be conceivably formed from an infinite number of sections in cross-section where abutting sections have different radii of curvature. In certain cases the radius of curvature of a section may be very large such that the section is almost flat. In other exemplary embodiments some of the sections may flat, concave or convex in cross-section. In yet further exemplary embodiment, smooth transitional radii may be formed between adjacent sections to smooth the transition between adjacent sections. With either of the aforementioned exemplary embodiments the cutting surface does not have any sharp edges in cross-section.

In another exemplary embodiment, the cutting surface may be defined in cross-section by sections, each section having a length in cross-section as measured along the surface that is in the range of about 0.003 to 0.005 inch in length. In a further exemplary embodiment, the cutting surface is defined by four sections. In yet a further exemplary embodiments the cutting layers on which the exemplary embodiment cutting surfaces are formed have a diameter in the range of 13 mm to 19 mm.

Figure 7:
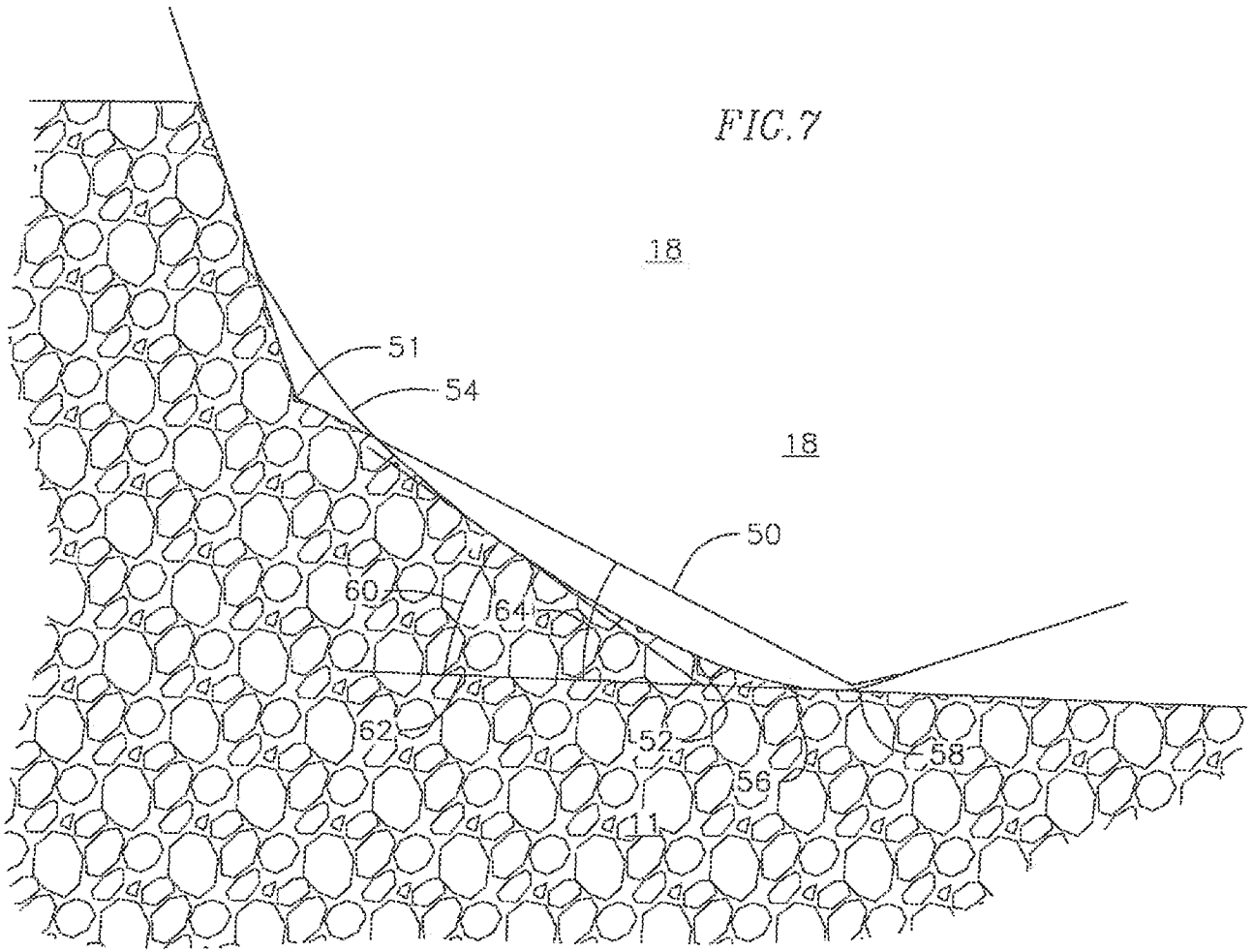
FIG. 7 is a partial cross-sectional view of two cutting layers superimposed over each other with one cutting layer having a straight chamfered edge and another cutting layer having an exemplary embodiment varying radius chamfered edge of the present invention.

Some of the advantages provided by the exemplary embodiment cutting elements of the present invention become more evident by comparing the inventive cutting elements to the prior art cutting elements. For example, compared to a 45° straight or flat chamfered surface 50 formed on a cutting layer 51 of the prior art, a chamfered surface 52 formed on cutting layer 54 with varying radius curvature according to an exemplary embodiment of the present invention has increased toughness at location 56 making contact with the earth formation, in comparison with the sharp edge 58 of cutting surface 50 that would make contact with the earth formation (FIG. 7). Furthermore, the angle 60 between the horizontal 62 and a tangent to chamfered surface 52 of the present invention is greater than the angle 64 between the horizontal and the 45° chamfered surface 50. The greater angle provides for a higher cutting layer cutting efficiency under normal conditions. The higher cutting efficiency is provided because more of the varying radii chamfered surface 52 makes contact with the earth formations as compared to a straight or flat chamfered surface 50. Furthermore in many cases a majority of the flat chamfered surface 50 may be spaced from the earth formations during cutting thereby being inefficient. Moreover, the varying radius chamfer provides for a smooth surface which enables the cuttings created during cutting or drilling to flow freely, thus reducing the chance of such cuttings sticking to the cutting edge. When stuck to the cutting edge such cuttings may reduce the cutting efficiency of the cutting edge and may cause an early failure of the cutting edge.

Figure 8:
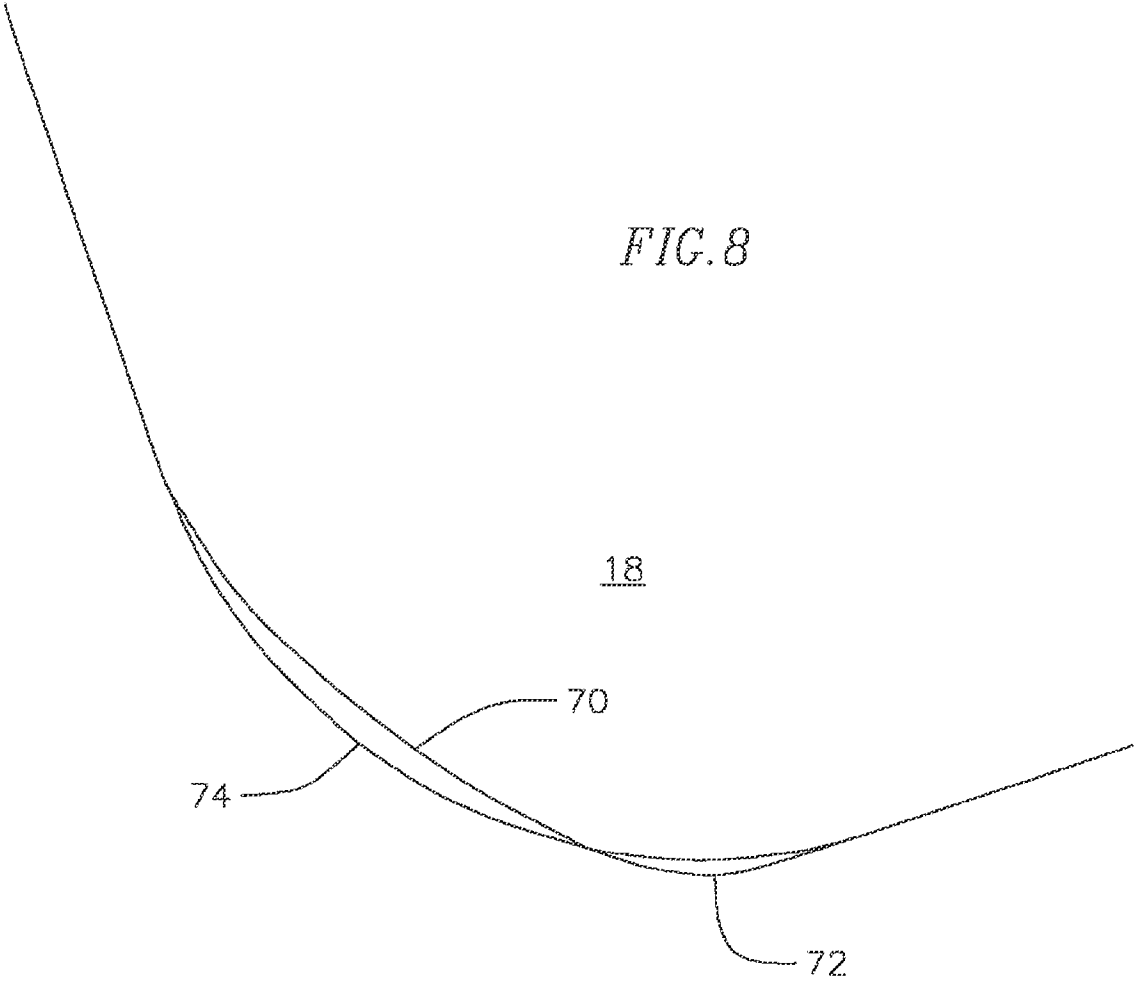
FIG. 8 is a partial cross-sectional view of two cutting layers superimposed over each other with one cutting layer having a constant radius cross-section and another cutting layer being an exemplary embodiment cutting layer having a varying radius cutting surface.

A varying radius cutting surface is also more efficient in cutting than a single radius cutting surface. As shown in FIG. 8, a varying radius cutting surface edge 70 has a relatively sharper edge 72 than a single radius cutting surface edge 74. Although relatively sharper, the edge 72 is smoothly curved. In this regard the edge 72 by being sharper provides for more aggressive cutting, while by being smoothly curved is not exposed to the high stresses that typically form on sharp edges.

Figure 9:
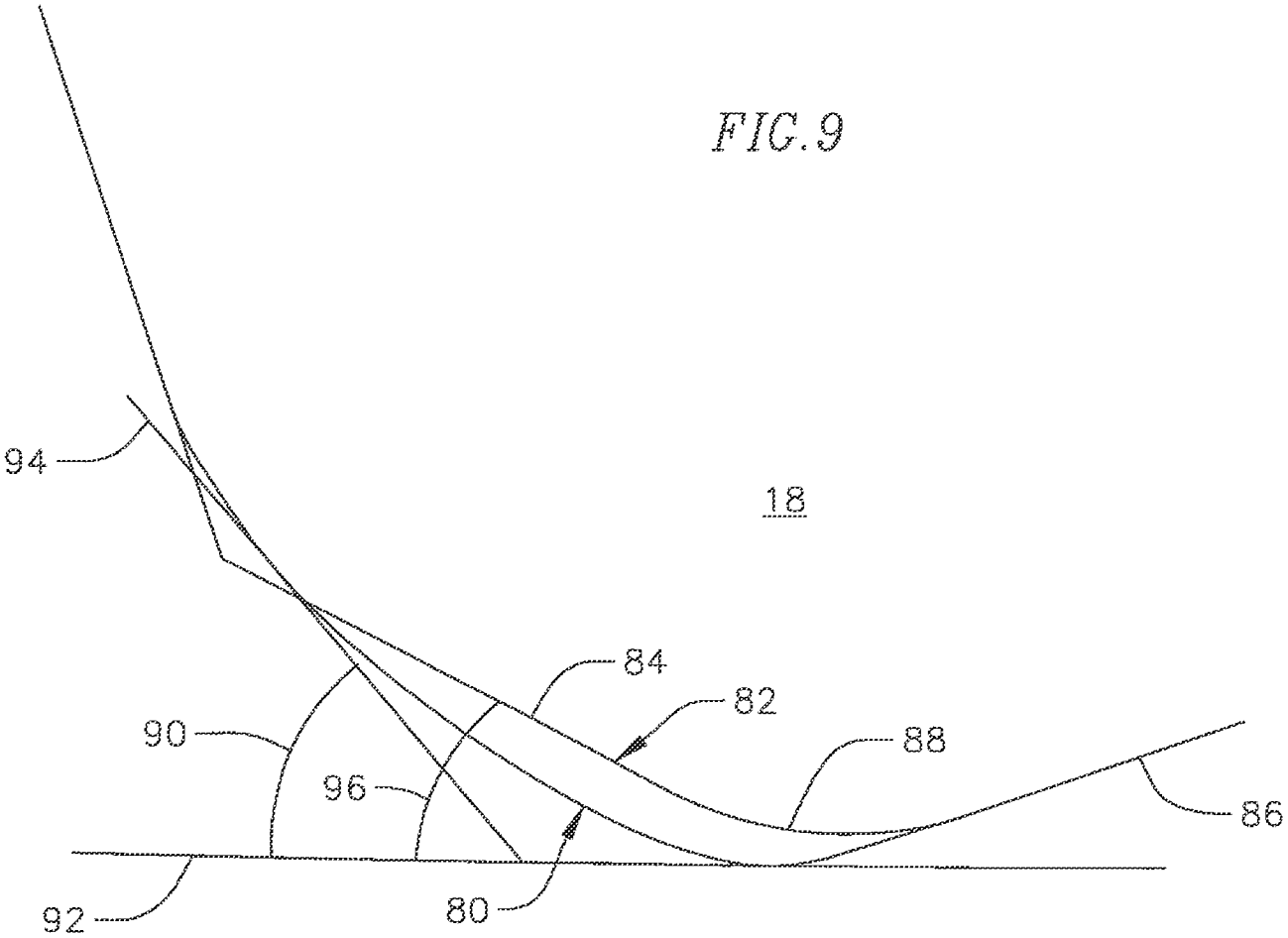
FIG. 9 is a partial cross-sectional view of two cutting layers superimposed over each other with one cutting layer having a straight chamfer and a constant radius section and the other cutting layer being an exemplary embodiment cutting layer having a varying radius chamfer cutting surface.

A varying radius chamfer cutting surface can be configured to have a more efficient back rake angle in the chamfer area than a straight chamfer cutting surface. This is even so in cases where the straight chamfer surface interfaces with another surface of the cutting layer via a constant radius surface. This is evident from FIG. 9 which depicts a varying radius chamfer cutting surface 80 superimposed over a straight chamber cutting surface 82 having a straight chamfer section 84 interfacing with an upper surface 86 of the cutting layer via a section 88 having a constant radius. As can be seen from FIG. 9, the varying radius chamfer cutting surface 80 provides for a more efficient, i.e., a greater, back rake angle in the chamfer area such as angle 90 measured between the horizontal 92 and a tangent 94 to the varying radius chamfer than the back rake angle 96 between the horizontal 92 and the straight chamfer 84 of a prior art cutting surface. This increased back rake angle also provides better flow of cuttings.

Figure 10:
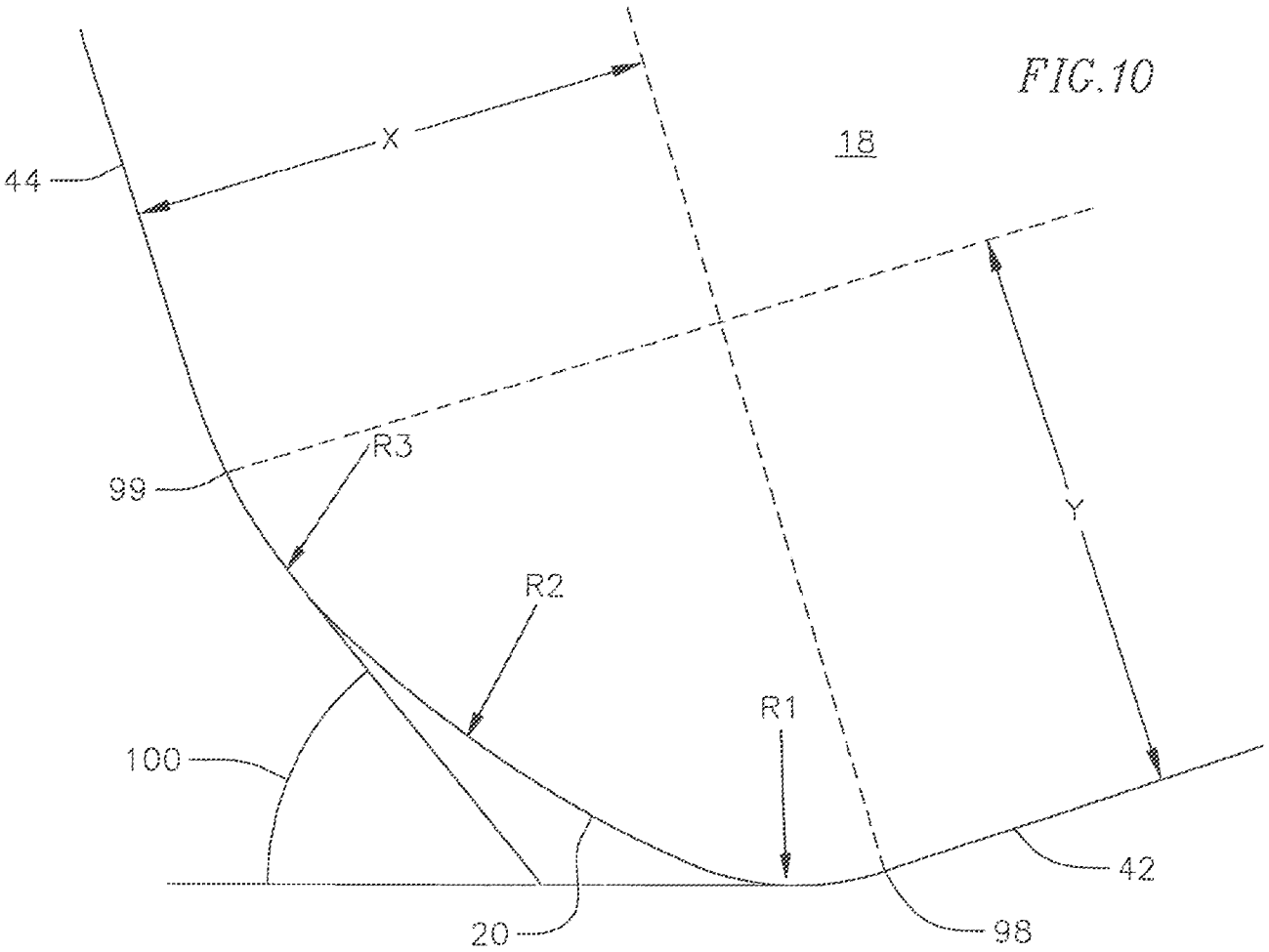
FIG. 10 is a partial cross-sectional view of an exemplary embodiment cutting layer of the present invention.

An exemplary embodiment cutting surface of the present invention is shown in FIG. 10. Generally, radii of curvature R1, R2, and R3 shown in FIG. 10 may be interrelated as follows. R2 may be greater than R1. R3 may be greater than R1. R2 can be smaller or greater than R3. To increase the efficiency of the cutting surface, especially at smaller depths of cut, a distance X, which is the distance between the circumferential surface 44 on the cutting layer and a point 98 on the upper surface 42 of the cutting layer where the varying curvature cutting surface 20 terminates, may be reduced and R3 may be made larger than R2. In this regard, the back rake angle 100 will be increased increasing cutting efficiency. In another exemplary embodiment each radius R1, R2 and R3 is 0.003 inch or greater. R2 and R3 may be very large and the sections they define may be relatively flat. Transitional radii may be formed between the sections defined by radii R1, R2 and R3 to insure that there are no sharp edges. Distance Y is the distance between the upper surface 42 in the cutting layer and a point 99 in the peripheral surface 44 of the cutting layer wherein varying curvature cutting surface terminates.

Figure 11:
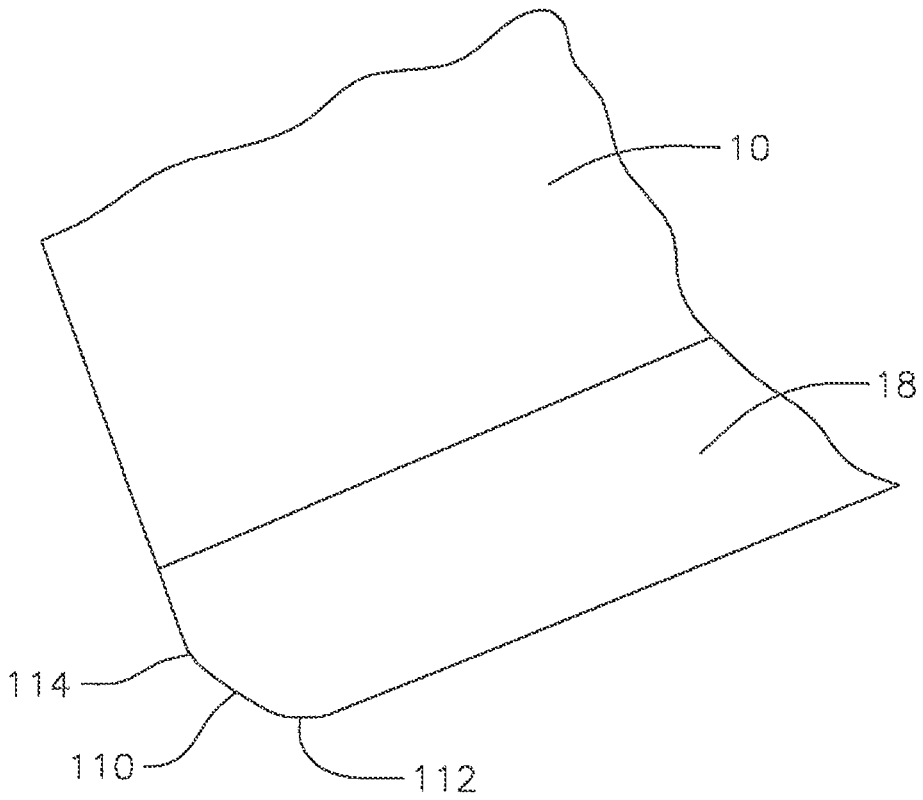
FIG. 11 is a partial cross-sectional view of an exemplary embodiment cutting element of the present invention.

In another exemplary embodiment, the cutting layer may have one or more chamfers in cross-section and at least a variable radius curvature section in cross-section. With this exemplary embodiment, an edge that would otherwise be formed on the cutting surface in cross-section between two chamfers or between a chamfer and a surface of the cutting layer is replaced by a variable radius section in cross-section. For example in the exemplary embodiment disclosed in FIG. 11, either or both of the edges that would otherwise be defined by a chamfer 110 formed on the cutting layer 18 are replaced by variable curvature sections 112, 114 which may be the same or different. In an exemplary embodiment, the edge defined by a chamfer that is positioned to make contact with a formation during cutting is replaced by a variable curvature section in cross-section.

Figure 12:
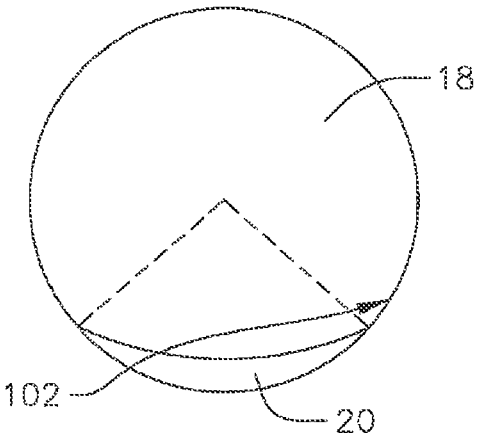
FIGS. 12 and 13 are top views of exemplary embodiment cutting elements of the present invention.

The exemplary embodiment cutting surfaces may span the entire span of the cutting surface. In another exemplary embodiment, the exemplary embodiment cutting surface 20 may span around only a portion 102 of the cutting layer 18 as for example shown in FIG. 12, such that when mounted on the bit, the cutting layer is oriented such that the exemplary embodiment cutting surface will make contact with the formation during cutting or drilling.

Figure 13:
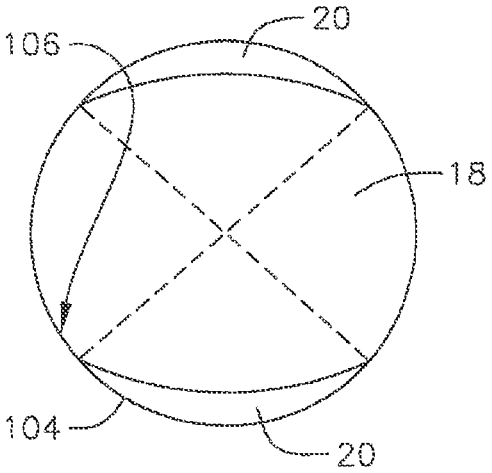

In other exemplary embodiments, the cutting layer is formed having two sections 104, 106 of the cutting layer including an exemplary embodiment cutting surface. These sections may be opposite each other, for example shown in FIG. 13 or may be spaced apart from each other by desirable angle or circumferential distance. In another exemplary embodiment, the cutting layer may be formed with multiple sections, as for example more than two sections, each section having an exemplary embodiment cutting surface. With these embodiments, the cutting element may be mounted on the bit body such that the inventive cutting surface will make contact with the earth formation during cutting or drilling. After the exemplary embodiment cutting surface is worn due to cutting or drilling, the cutting element can be rotated such that another section incorporating an exemplary embodiment cutting surface is positioned to make contact with the formation. Furthermore, a cutting element cutting surface may be formed with two or more sections located circumferentially around the cutting layer, each having a different geometry varying radius cutting surface in cross-section. In this regard, a single cutting element may be used to cut different types of formations by orienting a different section of the cutting layer to make contact with the formation.

The exemplary embodiment cutting surfaces may be formed using known methods such as electrode discharge machining (EDM) after forming the cutting element using sintering. In other words, EDM is used to cut the cutting surface so as to leave the appropriate varying radius curvature. In other exemplary embodiments, the can in which the cutting element is sintered is defined such that after sintering, the cutting layer has the desired cutting surface shape in cross-section having the desired varying radius curvature. In some instances, minor machining of the cutting surface may be required.

With the exemplary embodiments cutting elements, the cutting surface may be optimized for the type of cutting or drilling at hand by varying the variable radius curvature in cross-section of the various sections. In other exemplary embodiments, a section defining the varying radius curvature in cross-section may have a curvature opposite its adjacent section. For example, a section may be concave in cross-section while its adjacent section may be convex in cross-section. In other exemplary embodiments, the entire outer surface of the cutting layer may have a varying radius curvature and no sharp edges. By forming cutting layer cutting surfaces to have continuous varying radius of curvature, such cutting layers are susceptible to less edge chipping and wear and have increased wear toughness.

Although the present invention has been described and illustrated to respect to multiple exemplary embodiments thereof, it is to be understood that it is not to be so limited, since changes and modifications may be made therein which are within the full intended scope of this invention as hereinafter claimed.

What is claimed is:

1. A shear cutter type cutting element comprising:

a substrate for mounting on a drag bit; and an ultra hard material cutting layer over the substrate, said cutting layer comprising a surface portion for making contact with a material to be cut by said cutting element, said surface portion in cross-section having a varying curvature that is formed by a plurality of adjacent sections, each section having a different radius of curvature than its adjacent section, wherein the surface portion in cross-section comprises a first section adjacent to a second section which is adjacent a third section, wherein the first section is non-flat and comprises a first radius of curvature, wherein the third section is non-flat and comprises a third radius of curvature, wherein the second section is flatter than the first and third sections and wherein the third radius of curvature is greater than the first radius of curvature, wherein the cutting layer comprises a first surface interfacing with the substrate and a second surface opposite the first surface, wherein the first section extends from the second surface.

2. The cutting element as recited in claim 1, wherein the first and third sections curve in the same direction in cross-section.

3. The cutting element as recited in claim 1, wherein one of the first and third sections curves in a first direction, and wherein the other of the first and third sections curves in a second direction opposite the first direction.

4. The cutting element as recited in claim 1, wherein the second section is flat.

5. The cutting element as recited in claim 1, wherein the surface portion in cross-section defines a chamfer.

6. The cutting element as recited in claim 1, wherein the surface portion extends from a peripheral surface of the cutting layer.

7. The cutting element as recited in claim 1, wherein the cutting layer comprises a first surface interfacing with the substrate, a second surface opposite the first surface, and a peripheral surface between the first and second surfaces, wherein the third section extends from the peripheral surface.

8. The cutting element as recited in claim 1, wherein the surface portion in cross-section comprises at least 35 sections, each section having a different radius of curvature than its adjacent section.

9. The cutting element as recited in claim 1, wherein the second radius of curvature is greater than the third radius of curvature.

10. The cutting element as recited in claim 9, wherein the second radius of curvature is greater than the first radius of curvature.

11. A shear cutter type cutting element comprising:

a substrate for mounting on a drag bit; and an ultra hard material cutting layer over the substrate, said cutting layer comprising a surface portion for making contact with a material to be cut by said cutting element, said surface portion in cross-section having a varying curvature that is formed by a plurality of adjacent sections, each section having a different radius of curvature than its adjacent section, wherein the surface portion in cross-section comprises a first section adjacent to a second section which is adjacent a third section, wherein the first section is non-flat and comprises a first radius of curvature, wherein the third section is non-flat and comprises a third radius of curvature, wherein the second section is flatter than the first and third sections and wherein the third radius of curvature is greater than the first radius of curvature, wherein the cutting layer comprises a first surface interfacing with the substrate, a second surface opposite the first surface, and a peripheral surface between the first and second surfaces, wherein the third section extends from the peripheral surface.

12. The cutting element as recited in claim 11, wherein the first and third sections curve in the same direction in cross-section.

13. The cutting element as recited in claim 11, wherein one of the first and third sections curves in a first direction, and wherein the other of the first and third sections curves in a second direction opposite the first direction.

14. The cutting element as recited in claim 11, wherein the second section is flat.

15. The cutting element as recited in claim 11, wherein the surface portion in cross-section defines a chamfer.

16. The cutting element as recited in claim 11, wherein the surface portion in cross-section comprises at least 35 sections, each section having a different radius of curvature than its adjacent section.

17. The cutting element as recited in claim 11, wherein the second radius of curvature is greater than the third radius of curvature.

18. The cutting element as recited in claim 17, wherein the second radius of curvature is greater than the first radius of curvature.

19. A shear cutter type cutting element comprising:

a substrate for mounting on a drag hit; and an ultra hard material cutting layer over the substrate, said cutting layer comprising a surface portion for making contact with a material to be cut by said cutting element, said surface portion in cross-section having a varying curvature that is formed by a plurality of adjacent sections, each section having a different radius of curvature than its adjacent section, wherein the surface portion in cross-section comprises a first section adjacent to a second section which is adjacent a third section, wherein the first section is non-flat and comprises a first radius of curvature, wherein the third section is non-flat and comprises a third radius of curvature, wherein the second section is flatter than the first and third sections and wherein the third radius of curvature is greater than the first radius of curvature, wherein the surface portion in cross-section comprises at least 35 sections, each section having a different radius of curvature than its adjacent section.

20. The cutting element as recited in claim 19, wherein the second section is flat.

*21. A shear cutter type cutting element, comprising:*

*a substrate; and*

*an ultrahard layer on an end face of the substrate, the ultrahard layer including:*

*a central longitudinal axis;*

*a cylindrical peripheral side surface extending longitudinally from the substrate such that the central longitudinal axis extends longitudinally at a center of the cylindrical peripheral side surface of the ultrahard layer and the substrate; and*

*a cutting surface at an upper end of the ultrahard layer, opposite the substrate and intersecting the central longitudinal axis, extending to the cylindrical peripheral side surface and forming a cutting edge at its periphery,*

*wherein the cutting surface has more than two sections of varying radius of curvature along a plane in which the central axis lies, the more than two sections located circumferentially around the cutting surface and being spaced apart from one another, with a section of non-varying radius of curvature being therebetween; and*

*wherein the varying radius of curvature are selected from flat and convex sections.*

*22. The cutter of claim 21, wherein the varying radius of curvature include at least one convex section abutting to at least one flat section.*

*23. The cutter of claim 21, wherein the variance in the radius of curvature terminates at a point along the cutting surface a distance from a circumferential surface of the ultrahard layer.*

*24. The cutting element of claim 21, wherein a portion of the cutting surface, in cross-section, has a flat section.*

*25. The cutting element of claim 21, where the cutting surface is free of any sharp edges in cross-section.*

*26. The cutting element of claim 21, wherein a portion of the cutting surface at the central axis is flat and transitions into the varying radius of curvature for the plurality of sections at a distance from a circumferential surface of the ultrahard layer.*

*27. A fixed cutter drill bit comprising a body, blades extending from the body, and the cutting element as recited in claim 21 mounted thereon on at least one blade.*

*28. A shear cutter type cutting element, comprising:*

*a substrate; and*

*an ultrahard layer on an end face of the substrate, the ultrahard layer including:*

*a central longitudinal axis;*

*a cylindrical peripheral side surface extending longitudinally from the substrate and defining a periphery of the ultrahard layer; and*

*a cutting surface at an upper end of the ultrahard layer, opposite the substrate, the cutting surface comprising:*

*an upper surface intersecting the central longitudinal axis; and*

*a sectional surface extending between the upper surface and the cylindrical peripheral side surface, the sectional surface comprising a plurality of sections having varying radii of curvature along a plane in which the central axis lies;*

*wherein the sectional surface has a different geometry in different circumferential sections of the cutting face; and*

*wherein the cutting surface is free of any sharp edges in cross-section.*

*29. The cutter of claim 28, wherein the varying radius of curvature are selected from flat, convex, and concave.*

*30. The cutter of claim 29, wherein the varying radius of curvature include at least one convex section abutting at least one flat section, the at least one flat section abutting at least one concave section.*

*31. The cutter of claim 28, wherein the variance in the radius of curvature terminates at a point along the cutting surface a distance from a circumferential surface of the ultrahard layer.*

*32. The cutting element of claim 28, wherein a portion of the cutting surface, in cross-section, has a flat section.*

*33. The cutting element of claim 28, wherein a portion of the cutting surface at the central longitudinal axis is flat and transitions into the varying radius of curvature for the plurality of sections at a distance from the peripheral side surface of the ultrahard layer.*

*34. A fixed cutter drill bit comprising a body, blades extending from the body, and the cutting element as recited in claim 28 mounted thereon on at least one blade.*

*35. A shear cutter type cutting element, comprising:*

*a substrate; and*

*an ultrahard layer on an end face of the substrate, the ultrahard layer including:*

*a central longitudinal axis;*

*a cylindrical peripheral side surface extending longitudinally from the substrate such that the central longitudinal axis extends longitudinally at a center of the cylindrical peripheral side surface of the ultrahard layer and the substrate; and*

*a cutting surface at an upper end of the ultrahard layer, opposite the substrate and intersecting the central longitudinal axis, extending to the peripheral side surface and forming a cutting edge at its periphery,*

*wherein the cutting surface has a plurality of sections of varying radius of curvature, along a plane in which the central axis lies,*

*wherein a portion of the cutting surface at the central longitudinal axis is flat and transitions at a smoothly curved transition into the varying radius of curvature of the plurality of sections at a distance from the peripheral side surface of the ultrahard layer,*

*wherein the plurality of sections are located circumferentially around the cutting surface in spaced apart circumferential sections of the cutting surface.*

*36. The cutter of claim 35, wherein the varying radius of curvature are selected from flat, convex, and concave.*

*37. The cutter of claim 36, wherein the varying radius of curvature include at least one convex section abutting to at least one flat section, the at least one flat section abutting to at least one concave section.*

*38. The cutter of claim 35, wherein the variance in the radius of curvature terminates at a point along the cutting surface a distance from a circumferential surface of the ultrahard layer.*

*39. The cutting element of claim 35, where the cutting surface is free of any sharp edges in cross-section.*

*40. The cutting element of claim 35, wherein the cutting surface has more than two sections of varying radius of curvature.*

*41. A fixed cutter drill bit comprising a body, blades extending from the body, and the cutting element as recited in claim 35 mounted thereon on at least one blade.*

*42. A shear cutter type cutting element, comprising:*

*a substrate; and*

*an ultrahard layer on an end face of the substrate, the ultrahard layer including:*

*a central longitudinal axis;*

*a cylindrical peripheral side surface extending longitudinally from the substrate and defining a periphery of the ultrahard layer; and*

*a cutting surface at an upper end of the ultrahard layer, opposite the substrate, the cutting surface comprising:*

*an upper surface intersecting the central longitudinal axis; and*

*a sectional surface extending between the upper surface and the peripheral side surface, the sectional surface comprising a plurality of sections of varying radius of curvature along a plane in which the central axis lies;*

*wherein the plurality of sections comprises two sections that are alternatingly positioned between three convex sections, wherein the two sections are flatter than the three convex sections; and*

*wherein the sectional surface has a different geometry in adjacent circumferential sections of the cutting face.*

*43. The cutter of claim 42, wherein the varying radius of curvature are selected from flat, convex, and concave.*

*44. The cutter of claim 42, wherein the two sections include a first flat section and a second flat section, wherein the first flat section is adjacent to and between a first and a second of the three convex sections, wherein the second flat section is adjacent to and between the second convex section and a third of the three convex sections, and wherein the first convex section, the second convex section, and the third convex section have different radii of curvatures.*

*45. The cutter of claim 42, wherein the variance in the radius of curvature terminates at a point along the cutting surface a distance from the peripheral side surface of the ultrahard layer.*

*46. The cutting element of claim 42, where the cutting surface is free of any sharp edges in cross-section.*

*47. The cutting element of claim 42 wherein the upper surface is flat and transitions at a smoothly curved transition into the sectional surface at a distance from the peripheral side surface of the ultrahard layer.*

*48. The cutting element of claim 42, wherein the cutting surface has more than two sections of varying radius of curvature.*

*49. A fixed cutter drill bit comprising a body, blades extending from the body, and the cutting element as recited in claim 42 mounted thereon on at least one blade.*

* * * * *